United States Patent
Falchuk

(10) Patent No.: US 8,584,048 B2
(45) Date of Patent: Nov. 12, 2013

(54) METHOD AND SYSTEM FOR MULTI-TOUCH-BASED BROWSING OF MEDIA SUMMARIZATIONS ON A HANDHELD DEVICE

(75) Inventor: Benjamin W. Falchuk, Upper Nyack, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 179 days.

(21) Appl. No.: 12/474,791

(22) Filed: May 29, 2009

(65) Prior Publication Data

US 2009/0300530 A1 Dec. 3, 2009

Related U.S. Application Data

(60) Provisional application No. 61/057,010, filed on May 29, 2008.

(51) Int. Cl.
*G06F 3/033* (2013.01)
*G06F 3/048* (2013.01)

(52) U.S. Cl.
USPC .......... 715/863; 715/716; 715/719; 715/720; 715/861; 715/864

(58) Field of Classification Search
USPC .......... 715/716, 719, 720, 723, 864, 861, 863
See application file for complete search history.

(56) References Cited

U.S. PATENT DOCUMENTS

| | | | |
|---|---|---|---|
| 5,495,562 A | 2/1996 | Denney et al. | |
| 5,664,227 A | 9/1997 | Mauldin et al. | |
| 5,790,820 A * | 8/1998 | Vayda et al. | 715/834 |
| 5,852,435 A * | 12/1998 | Vigneaux et al. | 345/428 |
| 5,890,152 A | 3/1999 | Rapaport et al. | |
| 6,069,606 A * | 5/2000 | Sciammarella et al. | 345/660 |
| 6,281,898 B1 | 8/2001 | Nikolovska et al. | |
| 6,332,147 B1 * | 12/2001 | Moran et al. | 715/203 |
| 6,448,987 B1 * | 9/2002 | Easty et al. | 715/834 |
| 6,526,219 B1 | 2/2003 | Posa et al. | |
| 6,574,416 B1 | 6/2003 | Posa et al. | |
| RE38,401 E * | 1/2004 | Goldberg et al. | 715/720 |
| RE38,609 E * | 10/2004 | Chen et al. | 715/730 |
| 6,807,361 B1 * | 10/2004 | Girgensohn et al. | 386/227 |
| 6,977,659 B2 | 12/2005 | Dumitras et al. | |

(Continued)

OTHER PUBLICATIONS

International Search Report dated Dec. 2, 2009.

(Continued)

*Primary Examiner* — Nicholas Augustine
(74) *Attorney, Agent, or Firm* — Philip J. Feig

(57) ABSTRACT

The inventive system comprises a touch screen on a mobile device and an application that defines a set of functioning components that provide the functionality for navigating media. The inventive application comprises components including event handling touches on the touch screen, presentation and layout interacting with event handling, content cache storing media and metadata, and content loading connecting to and loading the media and the metadata from a remote storage device, such that the event handling component invokes one or more of the presentation and layout component, the content cache component and the content loading component in response to various touch screen interactions. The various touch screen interactions perform setting a browser shape, setting a range, focus, zoom in and out, and/or level of detail of the media segments, moving laterally in time, resetting a view, annotating and/or viewing annotations, playing, pausing, and stopping the media summarization.

21 Claims, 14 Drawing Sheets

MOVE LATERALLY IN "TIME"

USER SWIPES IN A CLOCKWISE MOTION AROUND THE PERIMETER AND THE TOOL RESPONDS BY MOVING FORWARD THROUGH TIME BY A PREDEFINED AMOUNT OR AN AMOUNT PROPORTIONAL TO THE SPEED OF THE SWIPE

COUNTER CLOCKWISE SWIPE ACHIEVES THE OPPOSITE EFFECT

(56) References Cited

U.S. PATENT DOCUMENTS

| | | | |
|---|---|---|---|
| 7,149,974 B2* | 12/2006 | Girgensohn et al. | 715/723 |
| 7,194,527 B2* | 3/2007 | Drucker et al. | 709/220 |
| 7,246,322 B2* | 7/2007 | Neely et al. | 715/747 |
| 7,274,741 B2 | 9/2007 | Ma et al. | |
| 7,340,333 B2* | 3/2008 | Lenneman et al. | 701/36 |
| 7,437,005 B2* | 10/2008 | Drucker et al. | 382/224 |
| 7,483,618 B1 | 1/2009 | Edwards et al. | |
| 7,559,039 B2* | 7/2009 | Ridgley et al. | 715/854 |
| 7,664,775 B2 | 2/2010 | Reed et al. | |
| 7,689,525 B2* | 3/2010 | Drucker et al. | 706/45 |
| 7,769,832 B2* | 8/2010 | Drucker et al. | 709/220 |
| 7,806,767 B2 | 10/2010 | Kitao | |
| 7,814,439 B2* | 10/2010 | Fitzmaurice et al. | 715/856 |
| 7,817,168 B2* | 10/2010 | Nagiyama et al. | 345/661 |
| 7,877,707 B2* | 1/2011 | Westerman et al. | 715/863 |
| 7,956,848 B2* | 6/2011 | Chaudhri | 345/173 |
| 8,006,198 B2* | 8/2011 | Okuma et al. | 715/810 |
| 2004/0141010 A1* | 7/2004 | Fitzmaurice et al. | 345/810 |
| 2005/0097135 A1* | 5/2005 | Epperson et al. | 707/104.1 |
| 2005/0120053 A1* | 6/2005 | Watson | 707/104.1 |
| 2005/0192924 A1* | 9/2005 | Drucker et al. | 707/1 |
| 2006/0197753 A1 | 9/2006 | Hotelling | |
| 2007/0011603 A1 | 1/2007 | Makela | |
| 2007/0027839 A1 | 2/2007 | Ives | |
| 2007/0033220 A1* | 2/2007 | Drucker et al. | 707/103 R |
| 2007/0061247 A1 | 3/2007 | Ramer et al. | |
| 2007/0083818 A1* | 4/2007 | Drucker et al. | 715/767 |
| 2007/0121015 A1 | 5/2007 | Gu et al. | |
| 2007/0192691 A1* | 8/2007 | Inazumi | 715/700 |
| 2007/0220575 A1 | 9/2007 | Cooper et al. | |
| 2007/0250785 A1* | 10/2007 | Nakamura et al. | 715/764 |
| 2007/0250901 A1 | 10/2007 | McIntire et al. | |
| 2007/0261001 A1* | 11/2007 | Nagiyama et al. | 715/810 |
| 2007/0266344 A1* | 11/2007 | Olcott et al. | 715/841 |
| 2008/0088602 A1 | 4/2008 | Hotelling | |
| 2008/0092168 A1 | 4/2008 | Logan et al. | |
| 2008/0122796 A1 | 5/2008 | Jobs et al. | |
| 2008/0298643 A1 | 12/2008 | Lawther et al. | |
| 2009/0058822 A1* | 3/2009 | Chaudhri | 345/173 |
| 2009/0064029 A1* | 3/2009 | Corkran et al. | 715/781 |
| 2009/0226044 A1 | 9/2009 | Ngan et al. | |
| 2009/0289937 A1 | 11/2009 | Flake et al. | |
| 2010/0145794 A1 | 6/2010 | Barger et al. | |

OTHER PUBLICATIONS

S.W. Smoliar, et al., "Content Based Video Indexing and Retrieval," IEEE Multimedia, vol. 1, Issue 2 pp. 62-72, Summer 1994.

B. Falchuk, et al., "A Tool for Video Content Understanding on Mobile Smartphones," Proc. 10th ACM Int'l Conf. on Human-Computer Interaction with Mobile Devices and Services (MobileHCI 2008) Amsterdam, 2008.

J. A. Hartigan, et al., "A K-Means Clustering Algorithm," Journal of the Royal Statistical Society, vol. 27, pp. 100-108, 1978.

* cited by examiner

CHOOSE VIDEO

BUY/RENT/CHOOSE VIDEO

SET CURRENT RANGE OF VIEW - (ZOOM)

ZOOM IN AND OUT OF DETAIL

PLAY/PAUSE/STOP

ANNOTATE OR VIEW ANNOTATIONS

METHOD AND SYSTEM FOR MULTI-TOUCH-BASED BROWSING OF MEDIA SUMMARIZATIONS ON A HANDHELD DEVICE

CROSS REFERENCE TO RELATED APPLICATIONS

The present invention claims the benefit of U.S. provisional patent application 61/057,010 filed May 29, 2008, the entire contents and disclosure of which are incorporated herein by reference as if fully set forth herein.

This application is related to the following commonly-owned, co-pending U.S. patent application filed on even date herewith, the entire contents and disclosure of which is expressly incorporated by reference herein as if fully set forth herein. U.S. patent application Ser. No. 12/474,760, for "METHOD AND SYSTEM FOR GENERATING AND PRESENTING MOBILE CONTENT SUMMARIZATION".

FIELD OF THE INVENTION

The present invention relates generally to visual representation of multidimensional data, and, more particularly to a system and method for using a multi-touch screen-enabled mobile device to navigate through a compact preview of online or local media.

BACKGROUND OF THE INVENTION

In a very short time period, YouTube has become one of the biggest video databases in the world. Featuring millions of videos, each one about 9 Mbytes big and several minutes long, thousands of new videos are uploaded each day. While YouTube user-generated videos are often short—minutes, not hours—iTunes, MSN, and Google Video offer short, episodic, and full length content. Other types of media with temporal dimension are also prevalent: for example, slideshows, music, annotated music, sequenced images, and so on. All these media are more and more accessed via the mobile Web browser or via mobile applications installed on the mobile device. Most mobile Web sites and applications, however, offer very poor and limited tools for content-understanding, that is, tools to help customers quickly understand the gist or substance of the content, especially video, they are interested in. At the same time, the mobile device market is thriving with scores of manufacturers making high-function mobile devices such as media players, cellular phones, PDA's, and so on. Many of these devices now employ touch or multi-touch screen technology.

Media summarization is the process of compacting, laying out, or otherwise making more accessible the complex contents of media to enable media content understanding. Gaining content understanding, then, is the act of browsing through content in order to create a mental model of it to some sufficient degree. The user's sufficiency requirements may hinge on their ability to determine specific media content such as: "Is a goal scored in the first 10 minutes of this football video?", "Does the video have a scene in which two men fight onboard a helicopter?", "Does the video have a scene in which a cat falls off a ledge after a baby scares it?", "Does the music score have a large crescendo around the midpoint of the score?". The above types of questions are almost impossible to be resolved on today's Web-centric media sharing sites such as Yahoo!®, Google™, and YouTube. In addition, to support these determinations, users require visual tools that support multiple intuitive ways to change their "field of view" into the media. Thus the benefits of content-based browsing—especially with respect to video—are clear.

There are few effective tools for video content non-linear browsing and understanding on high-functionality mobile devices and even fewer that exploit multi-touch technology. For example, FIG. 1 depicts YouTube on a mobile device. YouTube.com does not provide informative "preview" information for videos apart from a few video keyframes. Content-understanding comes only from the keyframe, the video duration (e.g. 03:52 min), and the aggregated "user tags" created by the community. Complex content cannot be easily inferred.

YouTube's Warp tool shows the relationships between videos in a graphical way, but not fine-grain details of the content within a given video. YouTube's Java application for smartphones only previews content from a single keyframe. MotionBox.com and other similar sites use the prevalent technique of showing a static keyframe strip below the movie. Guba.com employs a 4×4 matrix of keyframes for any given video, but the representation is non-navigable. Internet Archive Website lays out one keyframe for each minute of a video in question, to allow a somewhat weak or diluted view of the video content. Finally, note that the current art also enables a partial and limited video understanding through the use of textual "tags" but that the tag paradigm has several drawbacks that make it unsuitable as a generic media indexing paradigm, including: its weak semantics, low scalability, lack of hierarchy. These drawbacks make that paradigm particularly unsuitable for video content understanding, at least as the sole method of indexing.

Multi-touch is a human-computer interaction technique and the hardware devices that implement it, which allow users to compute without conventional input devices (e.g., mouse, keyboard). Multi-touch or a "multi-touch screen", consists of a touch screen (screen, table, wall, etc.) or touchpad, as well as software that recognizes multiple simultaneous touch points, as opposed to the standard (single) touchscreen (i.e. computer touchpad, ATM), which recognizes only one touch point. This effect is achieved through a variety of means, including but not limited to: heat, finger pressure, high capture rate cameras, infrared light, optic capture, and shadow capture. This definition of the term multi-touch applies throughout the present application.

BRIEF SUMMARY OF THE INVENTION

The inventive system comprises a touch screen on a mobile device and an application that defines a set of functioning components built to surround and support interactions on the same touch screen and that together provide the functionality for navigating, annotating, sharing, and transacting with media. The inventive application comprises an event handling component handling and reacting computationally to touches on the touch screen, a presentation and layout component interacting with the event handling component, a content cache component storing media and metadata, a content loading component connecting to and loading the media and the metadata from a remote storage device, such that the event handling component invokes one or more of the presentation and layout component, the content cache component and the content loading component in response to various touch screen interactions. In one embodiment, the content cache is logically split between the mobile device and another storage device, either on a network or directly connected to the mobile device. The various touch screen interactions cause the event handling component to perform at least one of setting a browser shape, setting a range of the media segments, setting a focus on one of the media segments, zooming in and out of the media segments, setting a level of detail of the media segments, moving laterally in time through the media summarization, resetting a view of the media segments, annotating one or more of the media segments, viewing annotations of the media segments, playing, pausing, and stopping the media summarization.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
FIG. 1 depicts YouTube on a mobile device.
Figure 2:
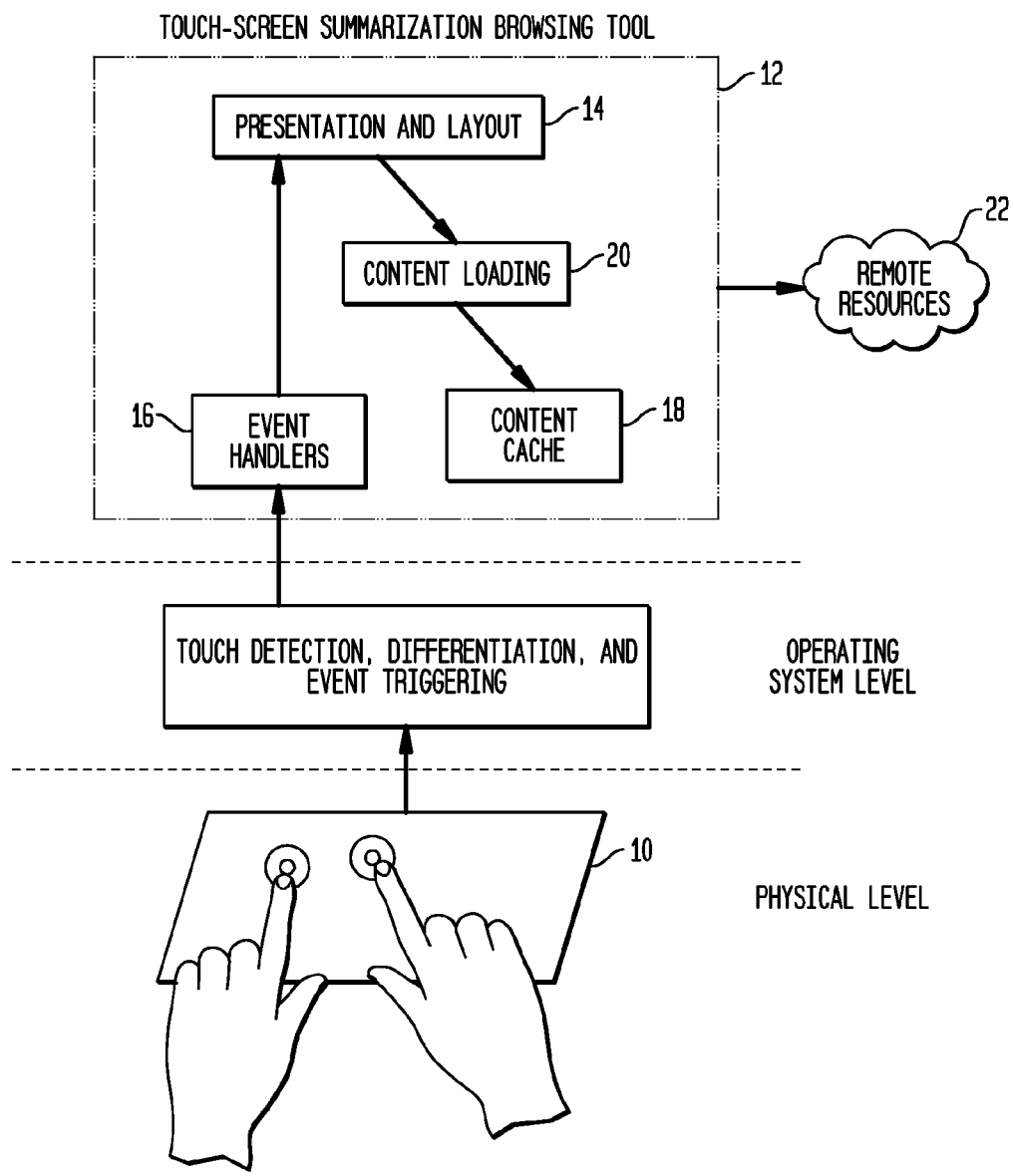
FIG. 2 shows a schematic diagram of the invention.

The inventive application defines a set of functioning components on the mobile device that together provide the functionality for navigating media. FIG. 2 shows a schematic diagram of the system. The touch-screen 10 of the device resides in a Physical level. The device has an Operating System layer that takes care of detecting touches and that transmits this information into the application layer in an appropriate way. The application 12 and its functioning components or functions can reside in the application layer. The types of touch-screen interactions that can be distinguished include TAP, DOUBLE TAP, TOUCH, and SWIPE which are defined as follows. TAP occurs when the finger touches the screen only briefly and comes off. DOUBLE TAP is two quick taps. TOUCH occurs when the finger touches the screen and stays on. SWIPE occurs when the finger touches the screen and then stays touching while following a path for a certain distance or time or speed.

The schematic diagram of FIG. 2 depicts the functional components of the system. The Application or browsing tool 12 can reside in an application layer or level. This tool 12 has components of Presentation and Layout 14, Event Handling 16, Content Cache 18, and Content Loading 20. The Presentation and Layout component 12, which is based on application configuration and user preferences, lays out and renders the media information on the multi-touch screen 10 for the user to see. Presentation and Layout 14 can interact with the Event Handling component 16 for example by setting up Event Handlers as necessary, to deal with subsequent user interactions.

The Event Handling component 16 handles touches on the multi-touch screen 10 and calls back to the application components once the event is understood, that is, in response to various touch screen interactions defined above, e.g., a tap, double tap, and so on. Application components understand how to infer application intent from a series of screen interactions.

The Content Cache component 18 stores (temporarily or semi-permanently) media and metadata on a local tertiary storage device, e.g., remote resources 22. Content Cache 18 may be logically split between the mobile device and some other storage device, either on a network or directly connected to the mobile device.

The Content Loading component 20 connects to and loads media and metadata from a remote server 22 as necessary.

Figure 6:
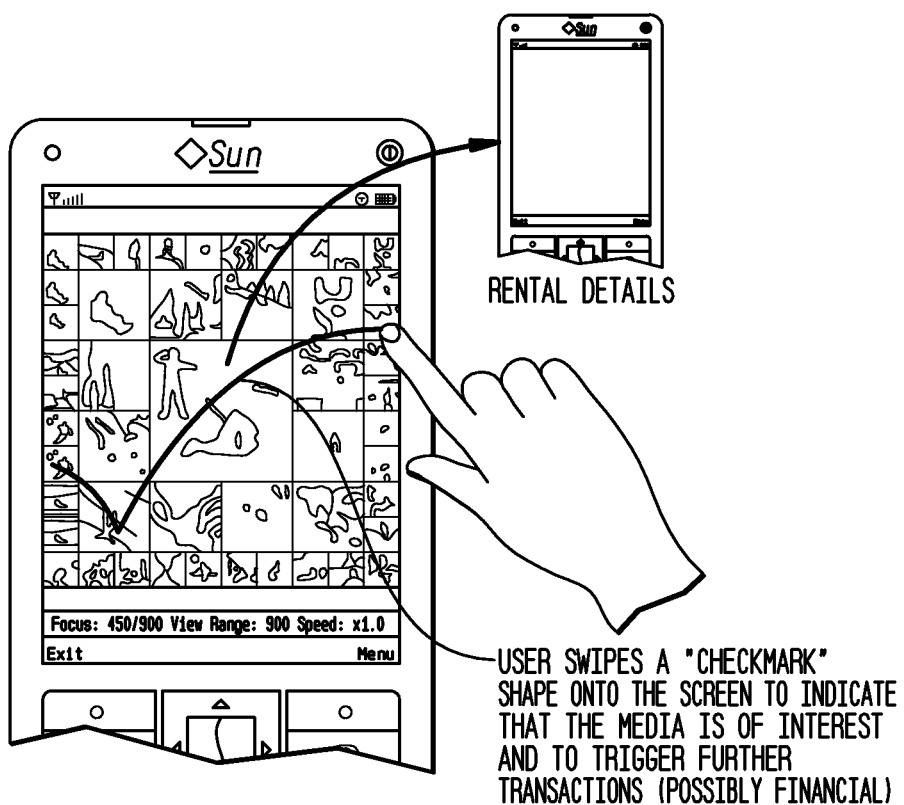
FIG. 6 shows a user indicating that he is finished browsing in an exemplary embodiment.

The media to be navigated is broken into fundamental parts and presented in browsable fashion. For video media, these fundamental parts can include evenly selected frames, keyframes, e.g., first frame of camera cut, frames of a specific positions relative to other video events, etc. For still imagery, parts may include evenly selected, key images, selected imagery relative to some other information, etc. These fundamental parts may be resized or reshaped. For audio media, possible parts may include audio fingerprints, waveforms, etc. For a multi-media presentation, a blend and/or combination of the above parts may be included. At any rate, the media can be ordered along at least one dimension, such as time, so that each video frame, musical note, or photograph is associated with a discrete time, or location, and the Presentation and Layout 14 component manages and presents the notions of both current range and current focus. The former comprises a subset of the media currently represented in the interface. For example, using time as a dimension, current range may consists of musical notes between time t1=10.1 and t2=30.5 sec., or the video frames between times 1:32:01 and 1:35:10. The latter (current focus) comprises the particular discrete place in the media that the user is most interested in at this particular moment in the browsing session and is usually rendered with proportionately more clarity, resolution or information than places in the media from the current range. Parts of the media displayed on the interface are referred to as 'segments'. While the segments can be combined and laid out in a number of different shapes on the interface, the notion of increased sampling towards the outer perimeter of the shape may hold. Thus in the case of a square shape, a central square focus area is "ringed" by any number of "rings" of squares of a quarter the area of the prior ring (as seen in FIG. 6).

Figure 3:
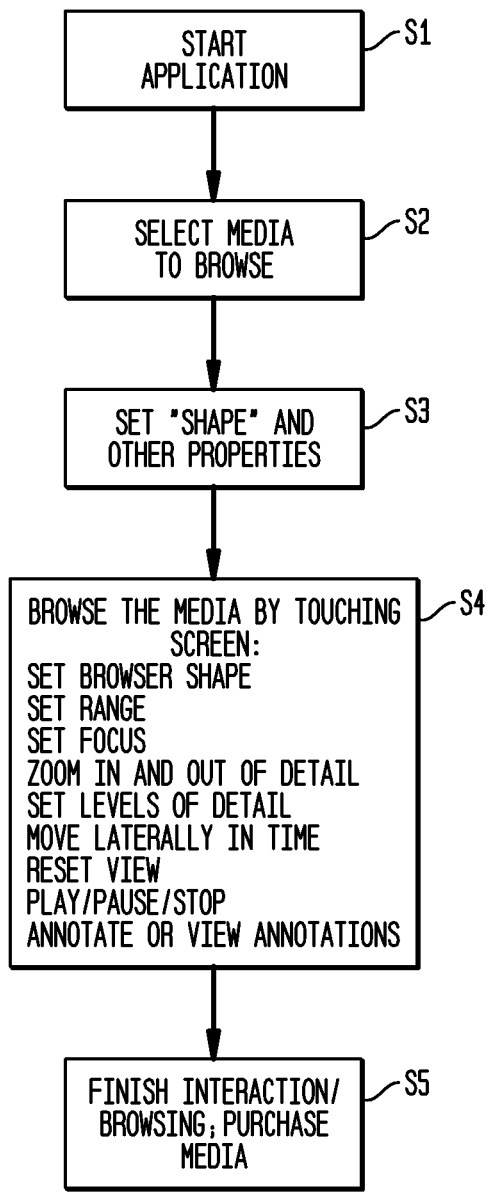
FIG. 3 is a flow diagram of a prototypical interaction with the invention.
Figure 4:
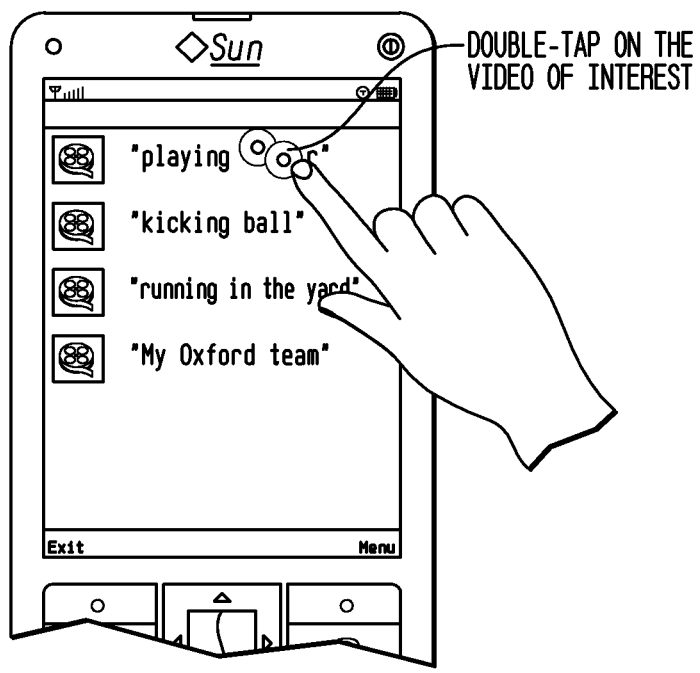
FIG. 4 shows activating a video in an exemplary embodiment.

FIG. 3 depicts a flow diagram of an exemplary embodiment of prototypical interaction with the application. In step S1, the user starts the application. In step S2, the user activates the media, e.g., video, to browse. An exemplary embodiment of selecting and activating a video is shown in FIG. 4. As illustrated, a user can choose a video by double-tapping on the touch screen 10.

Figure 5:
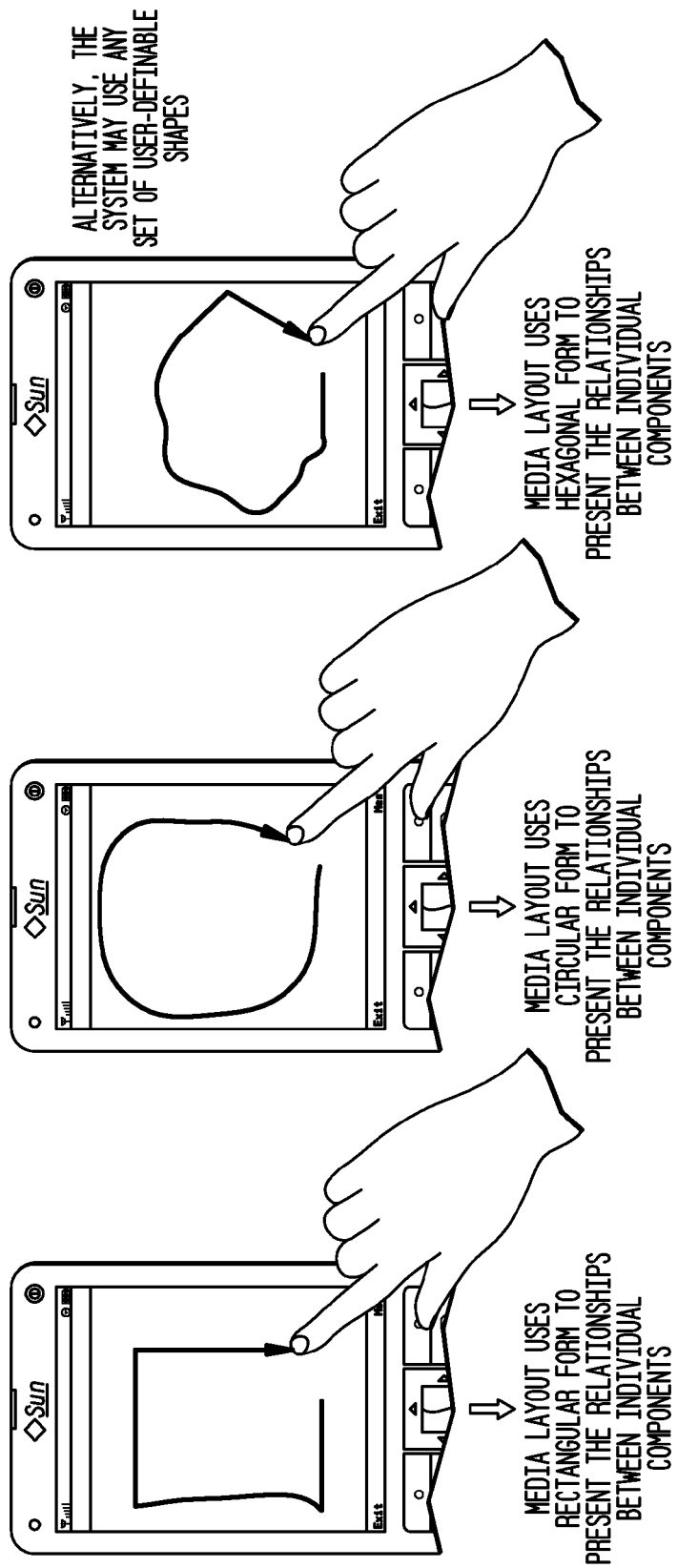
FIG. 5 shows setting a shape in an exemplary embodiment.

In step S3, the user sets the "shape" and properties of the visual metaphor on the screen. FIG. 5 shows setting a shape in an exemplary embodiment. Setting the shape of the graphic user interface (GUI) on the touch screen 10 can include selecting a shape of squares, circles, hexagons, flower-shape, etc., or pre-setting the relative proportions of visible media segments to each other. To set the shape or proportions, as shown in FIG. 5, initially a user can tap a tool icon corresponding to the setup option; the GUI awaits further input. The user next swipes on the screen, "drawing out" the shape that he wants to use for the layout. As shown in FIG. 5, drawing a square shape yields the default view of video; drawing a hexagon yields the honeycomb view, drawing a circle yields the circle view. In another embodiment, the shapes may be selectable from a pull down menu. The shapes and views are extensible and definable. Shape-setting can also occur at any later time in session and may be followed by a brief pause in which the application updates.

In step S4, the user performs browsing or navigating of the media by performing one or more sub-steps described below and illustrated in FIGS. 7-14.

In step S5, the user has finished browsing and can purchase, rent, or otherwise obtain the browsed media. FIG. 6 shows a user indicating that he is finished browsing. The user swipes a "checkmark" shape starting near the left hand middle side of the screen. This indicates that the media is of interest, e.g., "I'm ready to watch the full version of this media". Detection of this shape on the particular media triggers the presentation of further information, including—but not limited to—a process in which the user may purchase or rent the media, stream it, or obtain further details.

Figure 7:
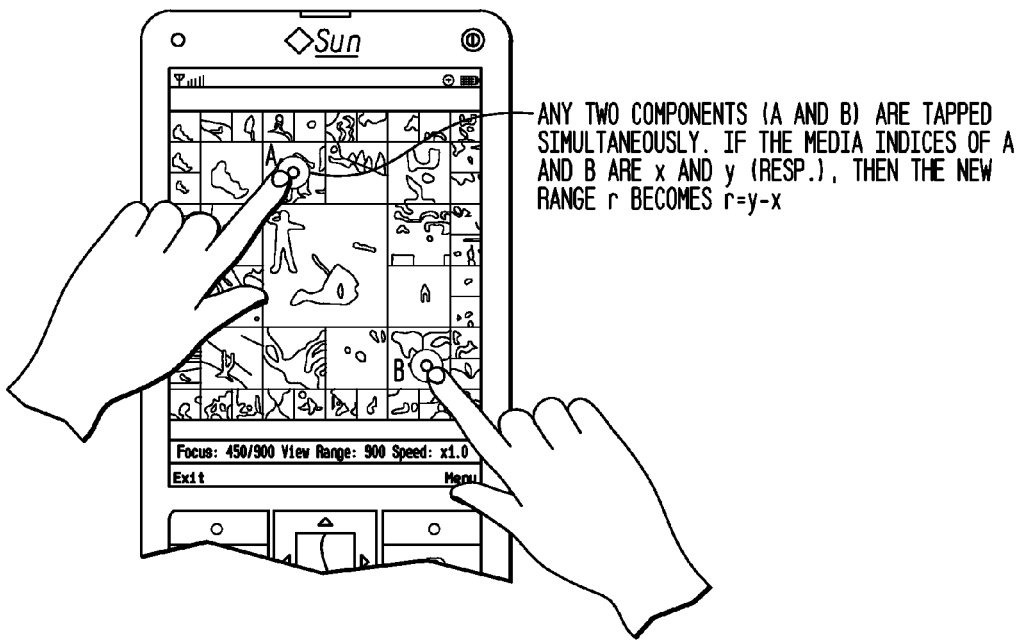
FIG. 7 shows setting the current range of view and zooming in and out in an exemplary embodiment.

The sub-steps of step S4 are described with reference to FIGS. 7-14. A user can set the current range of view (zoom), as shown in FIG. 7. Tapping any two visible media segments simultaneously changes the "current range" to be set to the segments in-between the selected ones. Changing the range, or number of media segments visible in the current view comprises a zoom in or out. In FIG. 7, media segments A and B are tapped simultaneously. If the media (temporal or other) indices of A and B are x and y, respectively, then the new range r becomes r=y−x. If the new range r is smaller than the previous range, then the subsequent view is a zoom-in to detail (same screen elements being used for a fewer number of media segments). On the other hand, if the new range r is larger than the previous range, then the subsequent view is a zoom-out of detail (same screen elements being used for a larger number of media segments).

Figure 8:
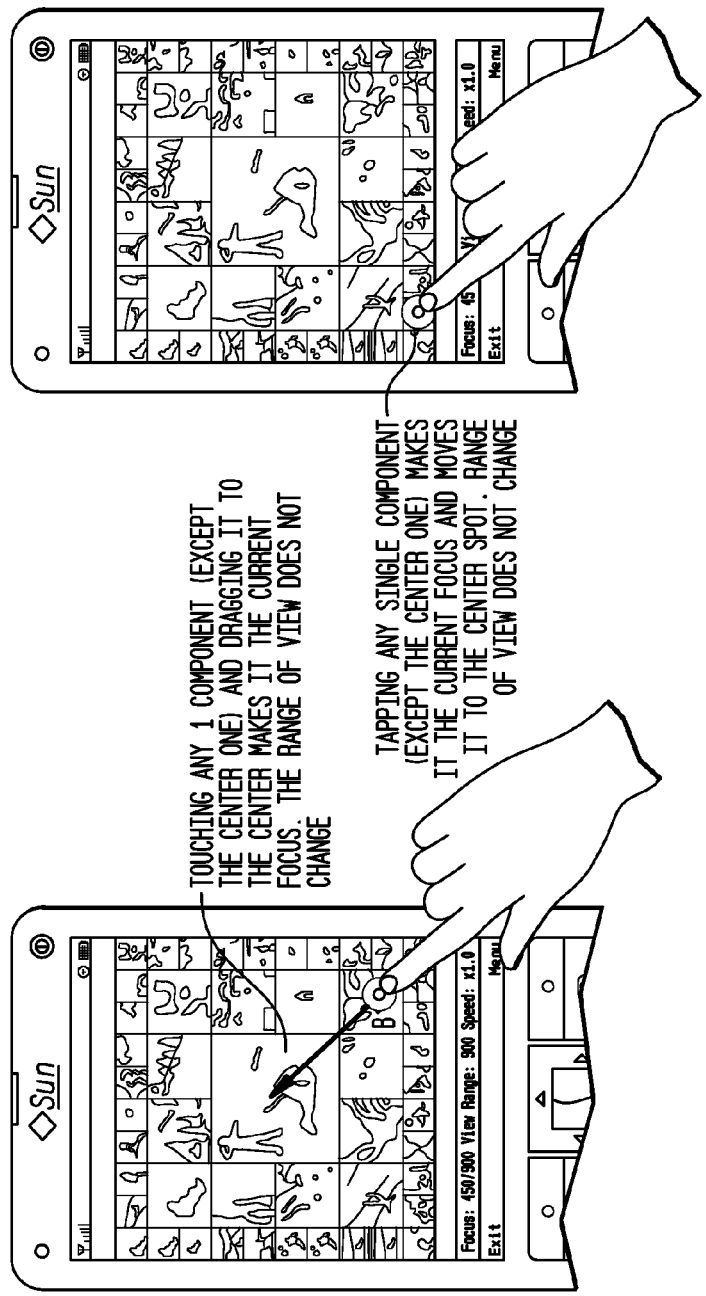
FIG. 8 shows setting the current focus in an exemplary embodiment.

A user can set the current focus, as shown in FIG. 8. Touching any media segment or frame (except the center one), and dragging it to the center of the current shape for the media being employed by Presentation and Layout 14 makes it the current focus. The range of view does not change. Alternatively, tapping a single segment (not the central area segment) also makes it the current focus and moves it to the center spot without changing the range.

Figure 9:
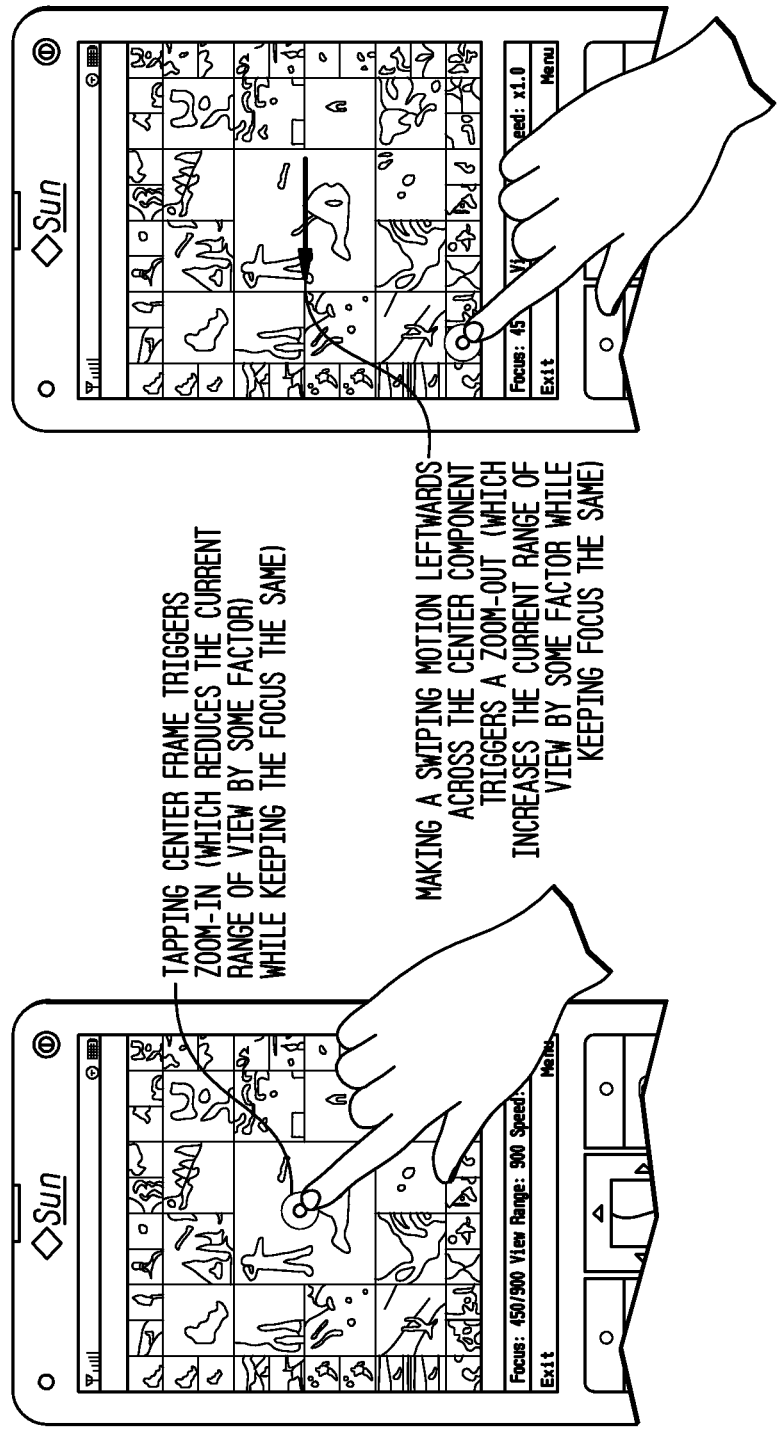
FIG. 9 shows zooming in and zoom out of detail in an exemplary embodiment.

A user can zoom in and zoom out of detail, as shown in FIG. 9. To zoom in at current focus, the user taps the center segment. This reduces the current range of view by some factor while keeping the current focus the same. To zoom out at current focus, the user swipes across the middle of the center segment from right to left, e.g., "draws" a "back arrow". This increases the current range of view by some factor while keeping the focus the same.

Figure 10:
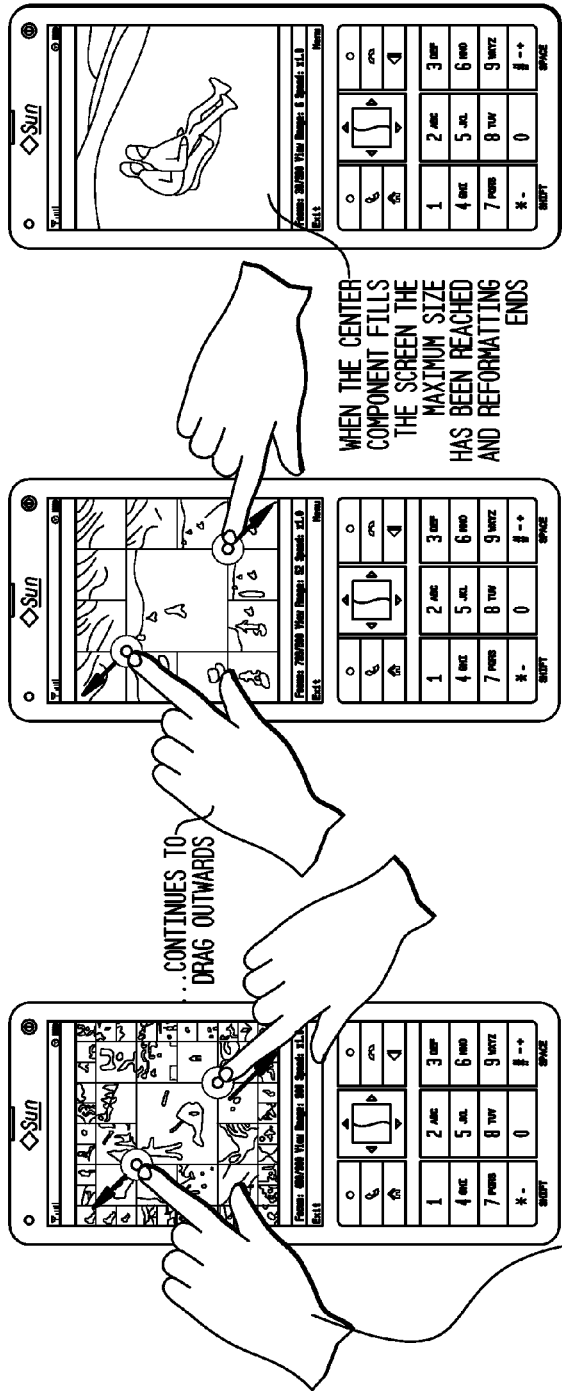
FIG. 10 shows setting the number of levels of detail in an exemplary embodiment.

FIG. 10 shows setting the number of rings or levels of detail. A user touches and holds, or "Grabs", the center segment by two of its corners, e.g., touching two corners, and then expands the placement of the fingers outwards, e.g., increases the size of center area and reduces number of "rings", or levels of detail in real time. By contrast, the user can move the placement of the fingers inwards, e.g., decrease the size of center area and increase number of "rings", or levels of detail. When the center media segment fills the screen, or when the size of the center media segment reaches a minimum size, the real time redrawing ends.

Figure 11:
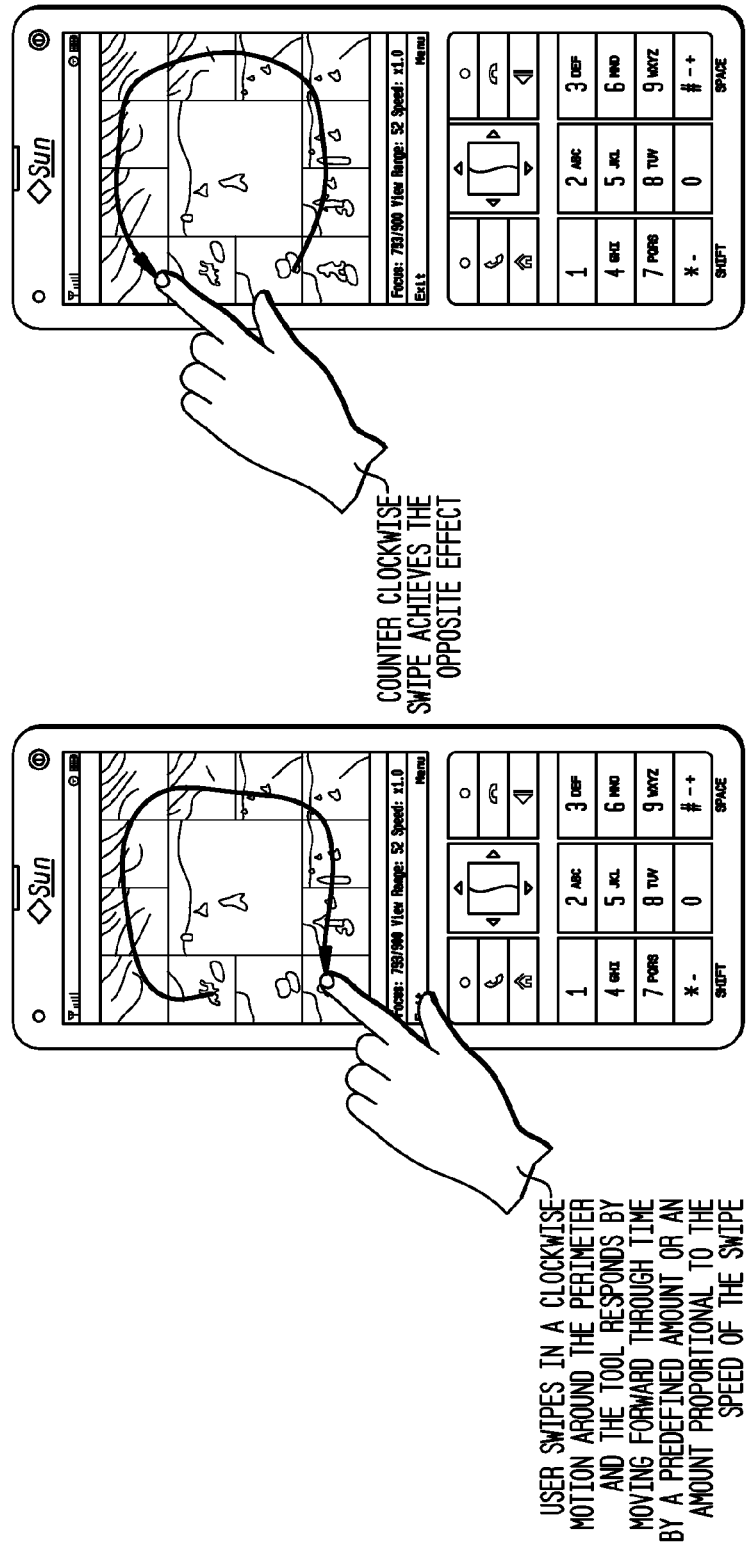
FIG. 11 shows browsing laterally in "time" in an exemplary embodiment.

A user can browse laterally in "time" through the media, or browse through whatever dimension is chosen as the organizing dimension (here we describe time but we are not limited to that). That is, the user can step forward and backward in time, as shown in FIG. 11. To move forward, the user swipes his finger in a clockwise motion around the perimeter region, causing the tool 12 to spin forward through the segments by a predetermined amount or an amount proportional to the speed of the swipe. The screen updates in real-time. To move backward, the user swipes counterclockwise and the tool 12 spins backward in a similar fashion.

Figure 12:
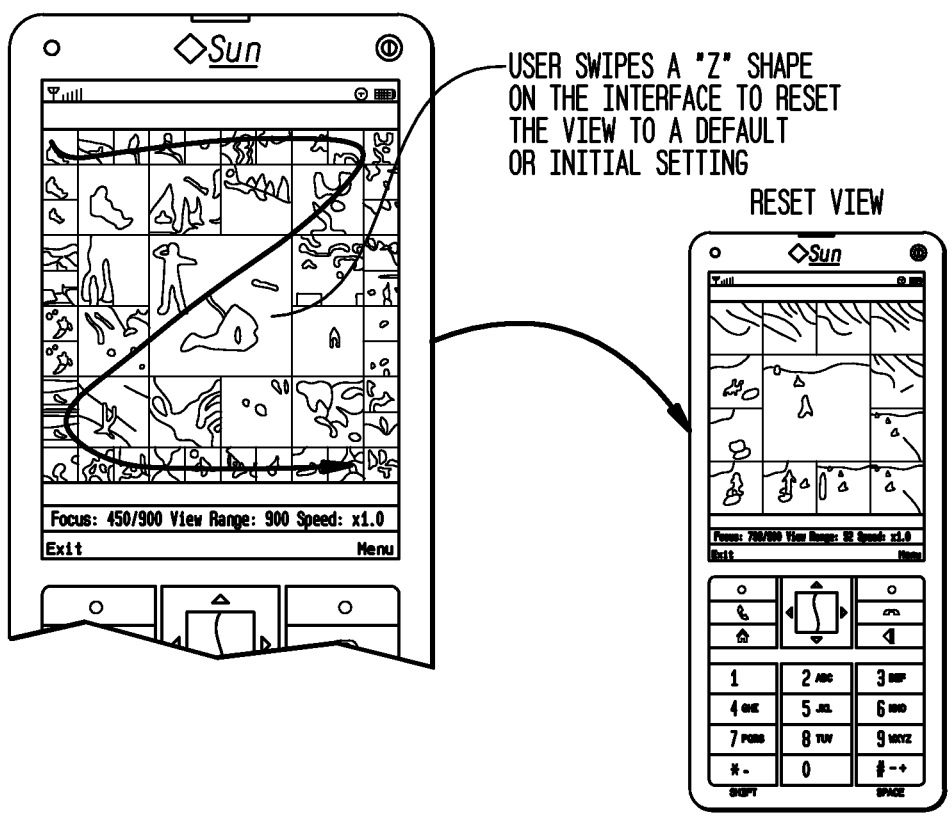
FIG. 12 shows resetting the view in an exemplary embodiment.

A user can reset the view, as shown in FIG. 12. To reset the view, the user touches the screen on the top left and swipes a "Z" shape rapidly across the whole screen. This resets the view to a default or initial setting and the system redraws the default view of the media or some other view that the user specified as default or a previous view.

Figure 13:
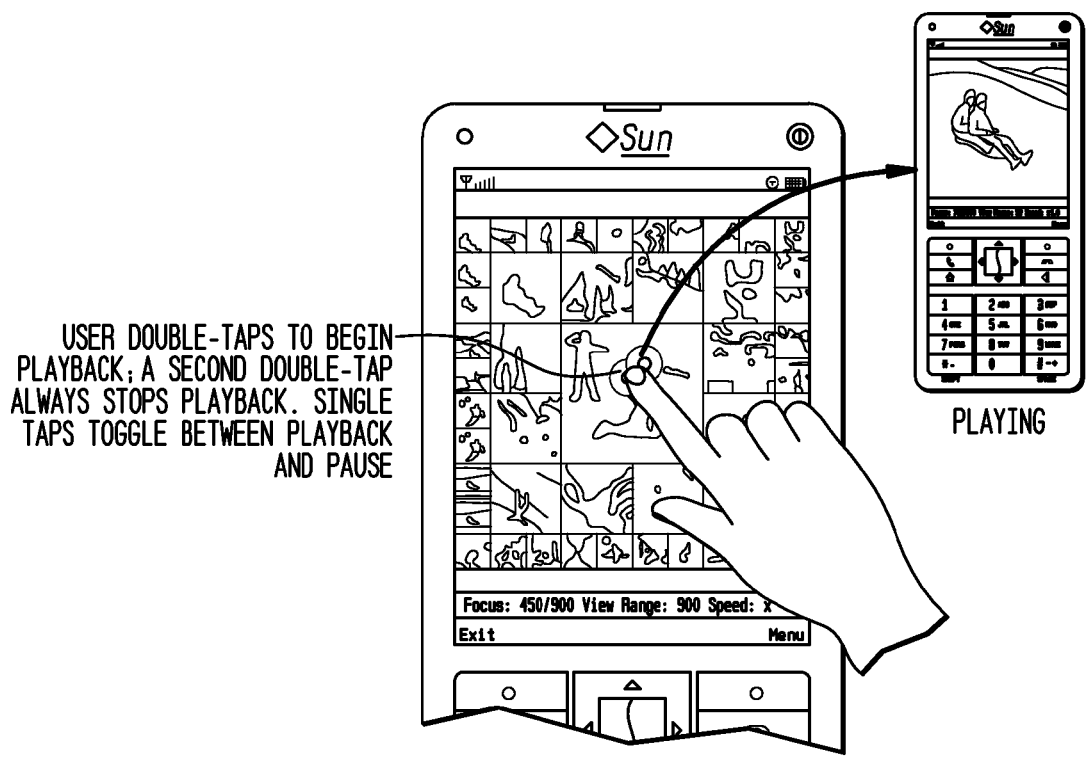
FIG. 13 shows play/pause/stop in an exemplary embodiment.

A user can play, pause, and stop at the current range, e.g., play-pause-stop, as shown in FIG. 13. The user double taps the center icon to begin playing back the media, taps to pause and taps to restart. Double tap during play stops and resets. Alternatively, a user can employ the play, pause, stop icons to perform these functions. FIG. 13 includes a state diagram of play-pause-stop. As discussed, a single tap while playing causes the play to pause, and a single tap while pausing causes the play to resume. A double tap while playing or pausing causes a stop. A double tap while stopped causes the play to resume.

Figure 14:
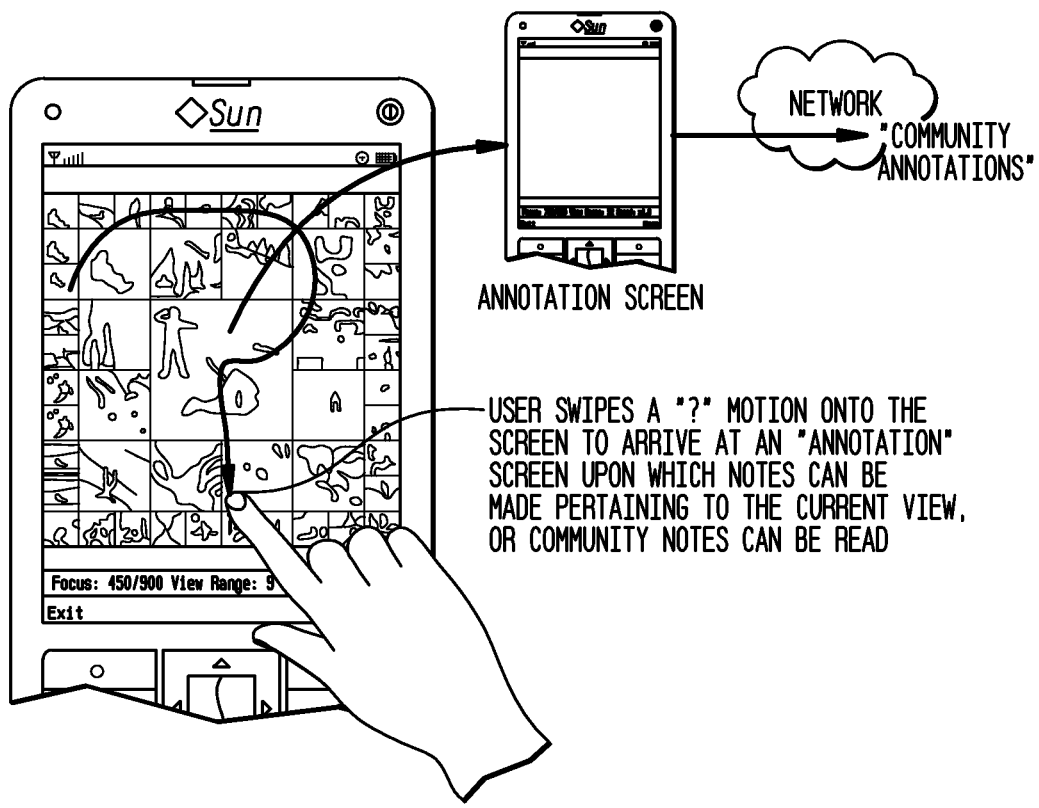
FIG. 14 shows annotating and viewing annotations of a segment in an exemplary embodiment.

A user can annotate a segment and/or view the annotations of a segment, as shown in FIG. 14. The user swipes a "question mark" shape onto the screen to arrive at an "annotation" screen upon which notes can be made pertaining to the current view, or community notes relating to the current view, media, or segment can be loaded (from a server or cache), filtered and presented to the user. In one embodiment, swiping a question mark presents additional menus. An annotation format might be—but is not limited to—a textual comment, a drawing, or a link to a Web resource. Annotations are saved in local 18 and server caches 22.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for navigating media summarization of mobile content having a plurality of media segments, comprising:
    a touch screen on a mobile device;
    an event handling component handling touches on the touch screen;
    a presentation and layout component interacting with the event handling component;
    a content cache component storing media and metadata; and
    a content loading component connecting to and loading the media and the metadata from a remote storage device;
    wherein the event handling component invokes one or more of the presentation and layout component ordered along a time dimension in the form of a plurality of concentric rings having a range of view with a focus and shape being selectable by a user, the content cache component and the content loading component in response to various touch screen interactions; and
    wherein the rings spin responsive to finger swipes by a user.

2. The system according to claim 1, wherein the content cache is logically split between the mobile device and another storage device, either on a network or directly connected to the mobile device.

3. The system according to claim 1, wherein the various touch screen interactions cause the event handling component to perform at least one of setting a browser shape, setting a range of the media segments, setting a focus on one of the media segments, zooming in and out of the media segments, setting a level of detail of the media segments, moving laterally in time through the media summarization, resetting a view of the media segments, annotating one or more of the media segments, viewing annotations of the media segments, playing, pausing, and stopping the media summarization.

4. The system according to claim 3, wherein the browser shape is selected from the group of circular, square, rectangular, and flower-like.

5. The system according to claim 1, wherein the touch screen is a multi-touch screen.

6. A computer readable medium having computer readable program for operating on a computer for navigating media summarization of mobile content having a plurality of media segments, said program comprising instructions that cause the computer to perform the steps of:
    selecting the media summarization to browse;
    setting shape in the form of a plurality of concentric rings ordered along a time dimension having a range of view with a focus and a shape being selectable by a user and other properties on a touch screen of a mobile device;
    browsing the media summarization on the touch screen of the mobile device, wherein the rings spin responsive to finger swipes by a user; and
    finishing the browsing.

7. The program according to claim 6, wherein the step of finishing the browsing further comprises one of purchasing the mobile content, and renting the mobile content.

8. The program according to claim 6, wherein the step of browsing comprises at least one of:
    setting a browser shape;
    setting a range of the media segments;
    setting a focus on one of the media segments;
    zooming in and out of the media segments;
    setting a level of detail of the media segments;
    moving laterally in time through the media summarization;
    resetting a view of the media segments;
    annotating one or more of the media segments;
    viewing annotations of the media segments; and
    playing, pausing, and stopping the media summarization.

9. The program according to claim 8, wherein the browser shape is selected from the group of circular, square, rectangular, and flower-like.

10. The program according to claim 6, wherein the touch screen is a multi-touch screen.

11. A method for navigating media summarization of mobile content having a plurality of media segments, said method comprising steps of:
    selecting the media summarization to browse;
    setting shape in the form of a plurality of concentric rings ordered along a time dimension having a range of view with a focus and a shape being selectable by a user and other properties on a touch screen of a mobile device;
    browsing the media summarization on the touch screen of the mobile device, wherein the rings spin responsive to finger swipes by a user; and
    finishing the browsing.

12. The method according to claim 11, wherein the step of finishing the browsing further comprises one of purchasing the mobile content, and renting the mobile content.

13. The method according to claim 11, wherein the step of browsing comprises at least one of:
    setting a browser shape;
    setting a range of the media segments;
    setting a focus on one of the media segments;
    zooming in and out of the media segments;
    setting a level of detail of the media segments;
    moving laterally in time through the media summarization;
    resetting a view of the media segments;
    annotating one or more of the media segments;
    viewing annotations of the media segments; and
    playing, pausing, and stopping the media summarization.

14. The method according to claim 13, wherein the browser shape is selected from the group of circular, square, rectangular, and flower-like.

15. The method according to claim 11, wherein the touch screen is a multi-touch screen.

16. The system according to claim 1, wherein the event handling component invokes an annotation screen responsive to a swipe on the touch screen.

17. A computer readable medium as set forth in claim 6, the program further comprising arriving at an annotation screen responsive to swiping the screen.

18. The method according to claim 13, further comprising invoking an annotation screen responsive to a swipe on the touch screen.

19. The system according to claim 1, wherein the amount of spin is proportional to the speed of the swipe.

20. A computer readable medium as set forth in claim 6, wherein the amount of spin is proportional to the speed of the swipe.

21. The method according to claim 13, wherein the amount of spin is proportional to the speed of the swipe.

\* \* \* \* \*

UNITED STATES PATENT AND TRADEMARK OFFICE
CERTIFICATE OF CORRECTION

PATENT NO. : 8,584,048 B2
APPLICATION NO. : 12/474791
DATED : November 12, 2013
INVENTOR(S) : Falchuk It is certified that error appears in the above-identified patent and that said Letters Patent is hereby corrected as shown below:

In the Claims

In Column 8, Line 57, in Claim 17, delete "A computer" and insert -- The computer --, therefor.

In Column 8, Line 65, in Claim 20, delete "A computer" and insert -- The computer --, therefor.

Signed and Sealed this
Thirty-first Day of March, 2015

Michelle K. Lee
*Director of the United States Patent and Trademark Office*